Apr. 17, 1923.
R. C. AGNER
FLEXIBLE CONDUIT
Filed June 9, 1921
1,451,800
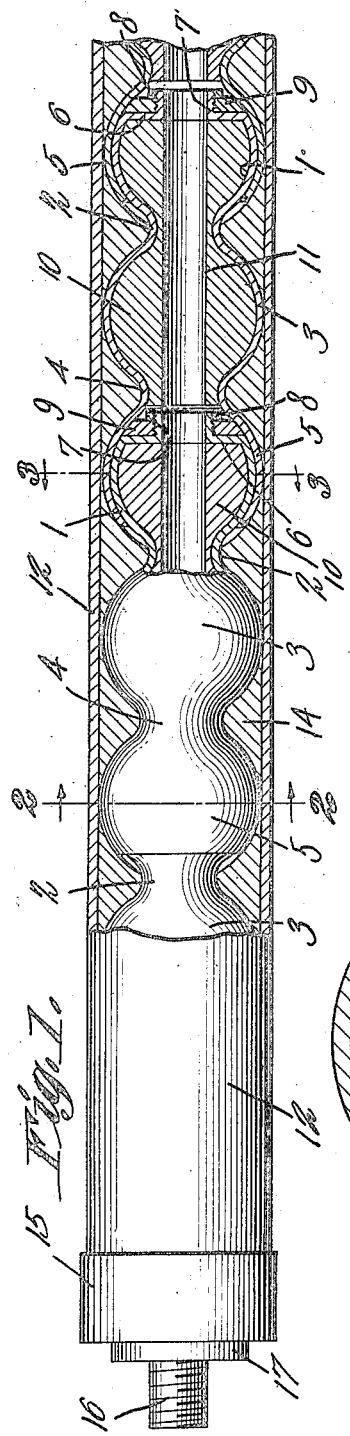
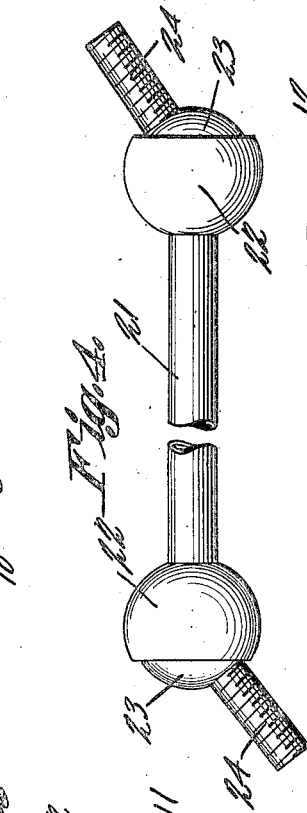
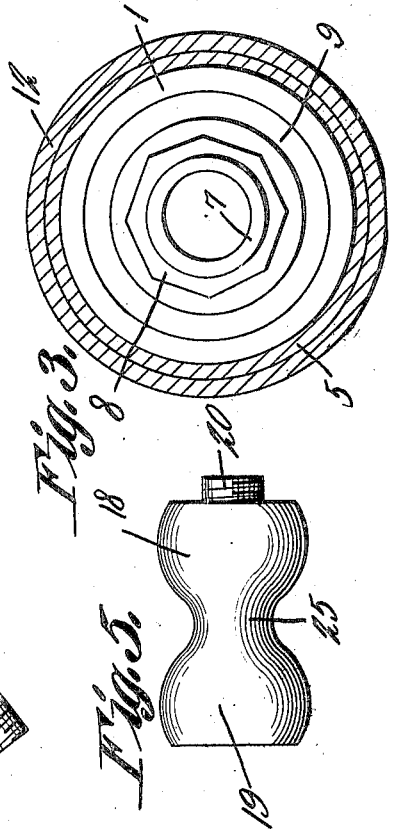
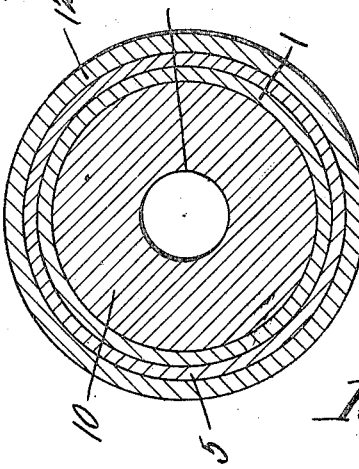
R. C. Agner,
Inventor
By C. A. Snow & Co.
Attorney Patented Apr. 17, 1923.

1,451,800

UNITED STATES PATENT OFFICE.

RAYMOND C. AGNER, OF BURLINGTON, WISCONSIN.

FLEXIBLE CONDUIT.

Application filed June 9, 1921. Serial No. 476,304.

*To all whom it may concern:*

Be it known that I, RAYMOND C. AGNER, a citizen of the United States, residing at Burlington, in the county of Racine and State of Wisconsin, have invented a new and useful Flexible Conduit, of which the following is a specification.

It is the object of this invention to provide a simple but strong and durable conduit which may be bent or flexed readily, the device being of use primarily but not exclusively, in connection with syringes or guns of the sort which are used for feeding grease under pressure to machinery, and, notably, to certain parts of an automobile.

In the accompanying drawings:—

Figure 1 shows in longitudinal section, a device constructed in accordance with the invention, parts being broken away and parts appearing in elevation; Figure 2 is a cross section on the line 2—2 of Figure 1; Figure 3 is a cross section on the line 3—3 of Figure 1; Figure 4 is an elevation showing a modified form of the invention; Figure 5 is an elevation showing a modified form of the invention.

Referring to the form shown in Figures 1, 2 and 3, the device includes a plurality of sections, preferably made of metal, each section embodying a head 1 of spherical outline connected by a goose-neck 2 with an approximately spherical body 3 united by a reduced neck 4 with a socket 5 which, likewise, is of spherical outline, the socket 5 of one section receiving the head 1 of an adjoining section movably, to afford a ball and socket joint. The head 1 has an end wall 6 from which a nipple 7 projects. A nut 8 is threaded on the nipple, a gasket 9 being interposed between the nut 8 and the end wall 6, the gasket being pressed outwardly by the nut 8, so as to contact with the socket 5 of an adjoining member and prevent leakage of grease between the parts 1 and 5. Within each section of the conduit is disposed a core 10 which may be made of rubber or any other suitable material, the cores 10 having communicating longitudinal passages 11.

The device, as thus far described, is located within a flexible casing 12, a resilient filler 14 being interposed between the casing 12 and the metallic sections of the conduit. The filler 14, like the core 10, may be fashioned from rubber or any other suitable material. On each end of the casing 12, a cap 15 is mounted. The end sections of the conduit terminate, each, in a tube 16, projecting through the cap 15 and threaded to receive a binding nut 17 bearing against the cap.

It is obvious that a device constructed as above set forth may be bent or flexed readily, to facilitate the transmission of grease to any part which is to be lubricated, the grease traversing the passages 11 and the gaskets 9 affording tight joints.

It is not necessary that each section of the conduit include the intermediate body 3. Thus, as shown in Figure 5, the section includes a head 18, a socket 19, a neck 25 connecting the parts 18 and 19, and a nipple 20, corresponding to the part 7. In Figure 4 of the drawings, a simplified form of the invention appears, the device including a tube 21 provided at its ends with sockets 22 wherein ball connections 23 are rotatable, the connections having tubes 24, corresponding to the part 16.

I claim:—

In a device of the class described, a conduit comprising sections connected by ball and socket joints; cores in the sections and having cooperating passages; a casing about the sections; and a filler interposed between the casing and the sections, the filler being resilient, and the casing being flexible.

In testimony that I claim the foregoing as my own, I have hereto affixed my signature in the presence of two witnesses.

RAYMOND C. AGNER.

Witnesses:
HUGH AGNER.
GEORGE WEILER.